United States Patent
Lazar et al.

(10) Patent No.: US 9,912,748 B2
(45) Date of Patent: Mar. 6, 2018

(54) SYNCHRONIZATION OF SNAPSHOTS IN A DISTRIBUTED STORAGE SYSTEM

(71) Applicant: Strato Scale Ltd., Herzlia (IL)

(72) Inventors: Aharon Lazar, Kiryat Ono (IL); Yael Feldmann, Ra'anana (IL)

(73) Assignee: STRATO SCALE LTD., Herzliya (IL)

( * ) Notice: Subject to any disclaimer, the term of this patent is extended or adjusted under 35 U.S.C. 154(b) by 293 days.

(21) Appl. No.: 14/594,188

(22) Filed: Jan. 12, 2015

(65) Prior Publication Data

US 2016/0205182 A1 Jul. 14, 2016

(51) Int. Cl.
| | | |
|---|---|---|
| *G06F 15/16* | (2006.01) | |
| *H04L 29/08* | (2006.01) | |
| *G06F 17/30* | (2006.01) | |
| *G06F 3/06* | (2006.01) | |

(52) U.S. Cl.
CPC .......... *H04L 67/1095* (2013.01); *G06F 3/067* (2013.01); *G06F 17/30088* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 5,159,667 | A | 10/1992 | Borrey et al. |
| 6,148,377 | A | 11/2000 | Carter et al. |
| 6,591,355 | B2 | 7/2003 | Schuster et al. |
| 6,823,429 | B1 | 11/2004 | Olnowich |
| 6,880,102 | B1 | 4/2005 | Bridge |
| 7,162,476 | B1 | 1/2007 | Belair et al. |
| 7,421,533 | B2 | 9/2008 | Zimmer et al. |
| 7,913,046 | B2 | 3/2011 | Kamay et al. |
| 8,082,400 | B1 | 12/2011 | Chang et al. |
| 8,266,238 | B2 | 9/2012 | Zimmer et al. |
| 8,352,940 | B2 | 1/2013 | Pafumi et al. |
| 8,544,004 | B2 | 9/2013 | Fultheim et al. |
| 8,671,445 | B1 * | 3/2014 | Wang ............... G06F 3/061 726/10 |

(Continued)

FOREIGN PATENT DOCUMENTS

WO      2009033074 A2      3/2007

OTHER PUBLICATIONS

U.S. Appl. No. 14/181,791 Office Action dated Feb. 12, 2016.
(Continued)

*Primary Examiner* — Joseph E Avellino
*Assistant Examiner* — Phyllis A Book
(74) *Attorney, Agent, or Firm* — D.Kligler IP Services LTD.

(57) ABSTRACT

A method includes storing data generated in a source node by sending write requests to multiple destination nodes. The destination nodes are requested to create snapshots of the data. The write requests are marked at the source node with marks that indicate to each destination node which of the write requests are pre-snapshot write requests that were issued before a snapshot request for a snapshot that the destination node is currently storing, and which of the write requests are post-snapshot write requests that were issued after the snapshot request for the snapshot that the destination node is currently storing. The snapshots are synchronized with one another at the destination nodes based on the marks.

12 Claims, 5 Drawing Sheets

(56) References Cited

U.S. PATENT DOCUMENTS

| | | | |
|---|---|---|---|
| 8,782,003 | B1 | 7/2014 | Patterson |
| 8,818,951 | B1 | 8/2014 | Muntz et al. |
| 8,943,260 | B2 | 1/2015 | Ben-Yehuda et al. |
| 9,183,035 | B2 | 11/2015 | Bacher et al. |
| 9,330,015 | B2 | 5/2016 | Baskakov et al. |
| 9,552,435 | B2 | 1/2017 | Wu et al. |
| 9,565,651 | B2 | 2/2017 | Julian et al. |
| 2002/0143868 | A1 | 10/2002 | Challenger et al. |
| 2003/0212869 | A1 | 11/2003 | Burkey |
| 2004/0153615 | A1 | 8/2004 | Koning et al. |
| 2006/0053139 | A1* | 3/2006 | Marzinski ............ G06F 11/1435 |
| 2006/0059242 | A1* | 3/2006 | Blackmore ......... G06F 12/1081 709/211 |
| 2006/0059282 | A1* | 3/2006 | Chaudhary ......... H04L 67/1097 710/100 |
| 2006/0143389 | A1 | 6/2006 | Killian et al. |
| 2006/0155674 | A1 | 7/2006 | Traut et al. |
| 2006/0155946 | A1* | 7/2006 | Ji .......................... G06F 3/0617 711/162 |
| 2006/0184652 | A1 | 8/2006 | Teodosiu et al. |
| 2006/0248273 | A1 | 11/2006 | Jernigan, IV et al. |
| 2007/0033375 | A1 | 2/2007 | Sinclair et al. |
| 2008/0294696 | A1 | 11/2008 | Frandzel |
| 2009/0049259 | A1* | 2/2009 | Sudhakar ............ G06F 11/1471 711/162 |
| 2009/0049271 | A1 | 2/2009 | Schneider |
| 2009/0055447 | A1* | 2/2009 | Sudhakar .............. G06F 3/0613 |
| 2009/0204636 | A1 | 8/2009 | Li et al. |
| 2009/0204718 | A1 | 8/2009 | Lawton et al. |
| 2009/0304271 | A1 | 12/2009 | Takahashi |
| 2009/0307435 | A1 | 12/2009 | Nevarez et al. |
| 2009/0307462 | A1 | 12/2009 | Fleming et al. |
| 2010/0017625 | A1 | 1/2010 | Johnson et al. |
| 2010/0077013 | A1 | 3/2010 | Clements et al. |
| 2010/0211547 | A1 | 8/2010 | Kamei et al. |
| 2010/0281208 | A1 | 11/2010 | Yang |
| 2011/0055471 | A1 | 3/2011 | Thatcher et al. |
| 2011/0066668 | A1 | 3/2011 | Guarraci |
| 2011/0072234 | A1 | 3/2011 | Chinya et al. |
| 2011/0271070 | A1 | 11/2011 | Worthington et al. |
| 2012/0005207 | A1 | 1/2012 | Gulhane et al. |
| 2012/0011504 | A1 | 1/2012 | Ahmad et al. |
| 2012/0030406 | A1 | 2/2012 | Chang et al. |
| 2012/0130848 | A1 | 5/2012 | Shishido et al. |
| 2012/0131259 | A1 | 5/2012 | Baskakov et al. |
| 2012/0158709 | A1 | 6/2012 | Gaonkar et al. |
| 2012/0192203 | A1 | 7/2012 | Corry et al. |
| 2012/0210042 | A1 | 8/2012 | Lim et al. |
| 2012/0233425 | A1 | 9/2012 | Yueh |
| 2012/0246386 | A1 | 9/2012 | Akutsu et al. |
| 2012/0272238 | A1 | 10/2012 | Baron |
| 2012/0317331 | A1 | 12/2012 | Broas |
| 2012/0324181 | A1 | 12/2012 | Garthwaite et al. |
| 2013/0080408 | A1 | 3/2013 | Cashman et al. |
| 2013/0132696 | A1 | 5/2013 | Tomida et al. |
| 2013/0179381 | A1 | 7/2013 | Kawabata et al. |
| 2013/0212345 | A1 | 8/2013 | Nakajima |
| 2013/0249925 | A1 | 9/2013 | Ginzburg |
| 2013/0275705 | A1 | 10/2013 | Schenfeld et al. |
| 2013/0326109 | A1 | 12/2013 | Kivity |
| 2013/0339568 | A1 | 12/2013 | Corrie |
| 2014/0114932 | A1 | 4/2014 | Mallaiah et al. |
| 2014/0115252 | A1 | 4/2014 | Yu |
| 2014/0244952 | A1 | 8/2014 | Raj et al. |
| 2014/0258655 | A1 | 9/2014 | Park et al. |
| 2014/0280664 | A1 | 9/2014 | Sengupta et al. |
| 2014/0359244 | A1 | 12/2014 | Chambliss et al. |
| 2014/0365708 | A1 | 12/2014 | Iwata et al. |
| 2015/0039838 | A1 | 2/2015 | Tarasuk-Levin et al. |
| 2015/0089010 | A1 | 3/2015 | Tsirkin et al. |
| 2015/0286414 | A1 | 10/2015 | Gordon et al. |
| 2016/0117103 | A1 | 4/2016 | Gallan et al. |
| 2016/0378355 | A1 | 12/2016 | Muthukkaruppan et al. |
| 2017/0031779 | A1* | 2/2017 | Helliker .............. H04L 67/1095 |

OTHER PUBLICATIONS

International Application #PCT/IB2015/057658 Search Report dated Jan. 12, 2016.
International Application #PCT/IB2015/057235 Search Report dated Dec. 29, 2015.
Amit et al., "Vswapper: A Memory Swapper for Virtualized Environments", Proceedings of the 19th International Conference on Architectural Support for Programming Languages and Operating Systems (AISPLOS'14), pp. 349-366, Salt Lake City, USA, Mar. 1-4, 2014.
Gupta et al., "Difference Engine: Harnessing Memory Redundancy in Virtual Machines", 8th USENIX Symposium on Operating Systems Design and Implementation, pp. 309-322, year 2010.
Heo et al., "Memory overbooking and dynamic control of Xen virtual machines in consolidated environments", Proceedings of the 11th IFIP/IEE International Conference on Symposium on Integrated Network Management, pp. 530-637, year 2009.
Waldspurger., "Memory Resource Management in VMware ESX Server", Proceedings of the 5th Symposium on Operating Systems Design and Implementation, 14 pages, Dec. 9-11, 2002.
Wood et al., "Memory Buddies: Exploiting Page Sharing for Smart Colocation in Virtualized Data Centers", Proceedings of the 2009 ACM SIGPLAN/SIGOPS International Conference on Virtual Execution Environments, pp. 31-40, Washington, USA, Mar. 11-13, 2009.
Gordon et al., "Ginkgo: Automated, Application-Driven Memory Overcommitment for Cloud Computing", ASPLOS's RESoLVE workshop, 6 pages, year 2011.
Zhao et al., "Dynamic memory balancing for virtual machines", Proceedings of the 2009 ACM SIGPLAN/SIGOPS International Conference on Virtual Execution Environments pp. 21-30, Washington, USA, Mar. 11-13, 2009.
Hines et al., "Applications Know Best: Performance-Driven Memory Overcommit with Ginkgo", IEEE 3rd International Conference on Cloud Computing Technology and Science, pp. 130-137, Nov. 29-Dec. 1, 2011.
International Application #PCT/IB2015/058841 Search Report dated Feb. 28, 2016.
VMWARE Inc., "Understanding Memory Resource Management in VMware vSphere® 5.0", Technical Paper, 29 pages, year 2011.
U.S. Appl. No. 14/260,304 Office Action dated May 25, 2016.
International Application # PCT/IB2016/050396 Search Report dated Mar. 13, 2016.
U.S. Appl. No. 14/672,466 Office Action dated Sep. 1, 2016.
U.S. Appl. No. 14/543,920 Office Action dated Nov. 18, 2016.
International Application # PCT/IB2014/067327 Search report dated May 20, 2015.
International Application # PCT/IB2014/067328 Search report dated May 18, 2015.
International Application # PCT/IB2015/050937 Search report dated Jun. 28, 2015.
International Application # PCT/IB2015/052177Search report dated Jul. 19, 2015.
Roussev, V., "Data Fingerprinting with Similarity Digests", Advances in Digital Forensics VI, Chapter 8, IFIP Advances in Information and Communication Technology, vol. 337, 20 pages, 2010.
Ben-Yehuda et al, U.S. Appl. No. 14/181,791, filed Feb. 17, 2014.
Ben-Yehuda et al, U.S. Appl. No. 14/260,304, filed Apr. 24, 2014.
Zivan, O., U.S. Appl. No. 14/333,521, filed Jul. 17, 2014.
Mitzenmacher et al., "The Power of Two Random Choices: Survey of Techniques and Results", Handbook of Randomized Computing, pp. 255-312, year 2000.
Hudzua et al., "Memory Aggregation for KVM", 41 pages, KVM forum, Nov. 2012.
VMware Virtualization, 8 pages, year 2014.
Hilland et al, "RDMA Protocol Verbs Specification," version 1.0, 243 pages, Apr. 2003.
Recio et al, "Remote Direct Memory Access Protocol Specification," RFC 5040, Network Working Group ,57 pages, Oct. 2007.
Hudzia et al, U.S. Appl. No. 61/974,467, filed Apr. 3, 2014.
Hudzia et al, U.S. Appl. No. 61/974,468, filed Apr. 3, 2014.

(56) References Cited

OTHER PUBLICATIONS

Hudzia et al, U.S. Appl. No. 61/974,470, filed Apr. 3, 2014.
Hudzia et al, U.S. Appl. No. 61/974,471, filed Apr. 3, 2014.
Hudzia et al, U.S. Appl. No. 61/974,472, filed Apr. 3, 2014.
Hudzia et al, U.S. Appl. No. 61/974,473, filed Apr. 3, 2014.
Hudzia et al, U.S. Appl. No. 61/974,475, filed Apr. 3, 2014.
Gordon et al, U.S. Appl. No. 62/065,688, filed Oct. 19, 2014.
Gordon et al, U.S. Appl. No. 14/543,920, filed Nov. 18, 2014.
Traeger, A., U.S. Appl. No. filed filed Nov. 12, 2014.
International Application # PCT/IB2015/052179 Search report dated Sep. 16, 2015.
U.S. Appl. No. 14/333,521 Office Action dated Nov. 27, 2015.
U.S. Appl. No. 14/260,304 Office Action dated Dec. 10, 2015.
U.S. Appl. No. 14/672,466 Office Action dated Jan. 30, 2017.
U.S. Appl. No. 15/017,687 office action dated Aug. 8, 2017.
European Application # 14882215.8 Search Report dated Aug. 1, 2017.
Newhall et al., "Reliable Adaptable Network RAM", IEEE International Conference on Cluster Computing, pp. 2-12, Sep. 29, 2008.
Newhall et al., "Nswap: A Network Swapping Module for Linux Clusters", European Conference on Parallel Processing, Part of the Lecture Notes in Computer Science book series (LNCS, vol. 2790), pp. 1160-1169, May 29, 2004.
Dramitinos et al., "Adaptive and Reliable Paging to Remote Main Memory", Journal of Parallel and Distributed Computing, vol. 58, Issue 3, pp. 357-388, Sep. 1, 1999.
Deshpande et al., "MemX: Virtualization of Cluster-Wide Memory", 39th IEEE International Conference on Parallel Processing (ICPP), pp. 663-672, Sep. 13, 2010.
U.S. Appl. No. 14/181,791 office action dated Jun. 28, 2017.
U.S. Appl. No. 14/538,848 office action dated Oct. 6, 2017.
European Application # 16754814.8 Search Report dated Oct. 24, 2017.
U.S. Appl. No. 15/424,912 office action dated Oct. 20, 2017.

\* cited by examiner

SYNCHRONIZATION OF SNAPSHOTS IN A DISTRIBUTED STORAGE SYSTEM

FIELD OF THE INVENTION

The present invention relates generally to computing systems, and particularly to methods and systems for data storage in compute-node clusters.

BACKGROUND OF THE INVENTION

Various solutions have been proposed for allocating memory resources to clients in a computer cluster. For example, U.S. Pat. No. 8,266,238, whose disclosure is incorporated herein by reference, describes an apparatus including a physical memory configured to store data and a chipset configured to support a virtual machine monitor (VMM). The VMM is configured to map virtual memory addresses within a region of a virtual memory address space of a virtual machine to network addresses, to trap a memory read or write access made by a guest operating system, to determine that the memory read or write access occurs for a memory address that is greater than the range of physical memory addresses available on the physical memory of the apparatus, and to forward a data read or write request corresponding to the memory read or write access to a network device associated with the one of the plurality of network addresses corresponding to the one of the plurality of the virtual memory addresses.

U.S. Pat. No. 8,082,400, whose disclosure is incorporated herein by reference, describes firmware for sharing a memory pool that includes at least one physical memory in at least one of plural computing nodes of a system. The firmware partitions the memory pool into memory spaces allocated to corresponding ones of at least some of the computing nodes, and maps portions of the at least one physical memory to the memory spaces. At least one of the memory spaces includes a physical memory portion from another one of the computing nodes.

U.S. Pat. No. 8,544,004, whose disclosure is incorporated herein by reference, describes a cluster-based operating system-agnostic virtual computing system. In an embodiment, a cluster-based collection of nodes is realized using conventional computer hardware. Software is provided that enables at least one VM to be presented to guest operating systems, wherein each node participating with the virtual machine has its own emulator or VMM. VM memory coherency and I/O coherency are provided by hooks, which result in the manipulation of internal processor structures. A private network provides communication among the nodes.

SUMMARY OF THE INVENTION

An embodiment of the present invention that is described herein provides a method including storing data generated in a source node by sending write requests to multiple destination nodes. The destination nodes are requested to create snapshots of the data. The write requests are marked at the source node with marks that indicate to each destination node which of the write requests are pre-snapshot write requests that were issued before a snapshot request for a snapshot that the destination node is currently storing, and which of the write requests are post-snapshot write requests that were issued after the snapshot request for the snapshot that the destination node is currently storing. The snapshots are synchronized with one another at the destination nodes based on the marks.

In some embodiments, sending the write requests includes sending to the multiple destination nodes multiple respective replicas of same data. In some embodiments, synchronizing the snapshots includes distinguishing in each destination node between the pre-snapshot write requests and the post-snapshot write requests using the marks, and serving only the pre-snapshot write requests. In an example embodiment, the method includes, in each destination node, queuing each post-snapshot write request until becoming a pre-snapshot write request due to arrival of a subsequent snapshot request.

In another embodiment, synchronizing the snapshots includes, in each destination node, queuing the write requests and serving only the queued write requests that become pre-snapshot write requests. In a disclosed embodiment, marking the write requests includes tagging each write request with a respective counter value indicating the snapshot that was most recently requested by the source node. Synchronizing the snapshots may include, in each destination node, distinguishing between the pre-snapshot write requests and the post-snapshot write requests by comparing the respective counter value of each write request with a reference counter value of the snapshot that the destination node is currently storing.

There is additionally provided, in accordance with an embodiment of the present invention, a system including at least a source node and multiple destination nodes. The source node is configured to store data by sending write requests to the destination nodes, and to mark the write requests with marks that indicate to each destination node which of the write requests are pre-snapshot write requests that were issued before a snapshot request for a snapshot that the destination node is currently storing, and which of the write requests are post-snapshot write requests that were issued after the snapshot request for the snapshot that the destination node is currently storing. The destination nodes are configured to synchronize snapshots with one another based on the marks.

There is also provided, in accordance with an embodiment of the present invention, a computer software product, the product including a tangible non-transitory computer-readable medium in which program instructions are stored, which instructions, when read by processors of a source node and multiple destination nodes that are interconnected by a communication network, cause the processors to store data generated in the source node by sending write requests to the multiple destination nodes, to request the destination nodes to create snapshots of the data, to mark the write requests at the source node with marks that indicate to each destination node which of the write requests are pre-snapshot write requests that were issued before a snapshot request for a snapshot that the destination node is currently storing, and which of the write requests are post-snapshot write requests that were issued after the snapshot request for the snapshot that the destination node is currently storing, and to synchronize the snapshots with one another at the destination nodes based on the marks.

The present invention will be more fully understood from the following detailed description of the embodiments thereof, taken together with the drawings in which:

DETAILED DESCRIPTION OF EMBODIMENTS

Overview

Figure 1:
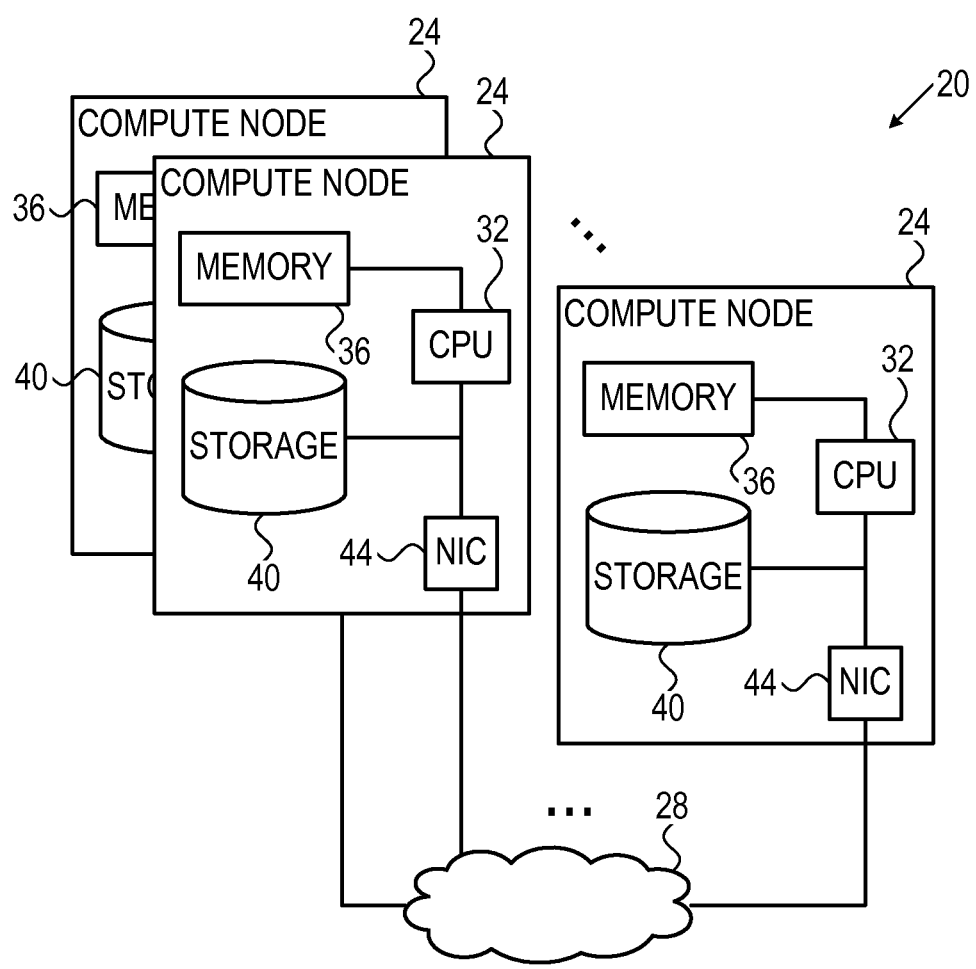
FIG. 1 is a block diagram that schematically illustrates a compute-node cluster, in accordance with an embodiment of the present invention.

Embodiments of the present invention that are described herein provide improved methods and systems for data storage in compute-node clusters. The compute nodes run clients that store and retrieve data by accessing logical volumes, also referred to as virtual disks. The data of a given logical volume is typically distributed across multiple physical storage devices of multiple compute nodes.

In the disclosed embodiments, each compute node runs one or more local File Systems (FSs) that manage the physical storage devices of that node. When a client sends data for storage, the data is divided into stripes and each stripe is replicated and forwarded to the local FSs of the nodes designated to store this data. Each local FS stores the data as files in its local physical storage devices. The compute-node cluster further supports a process that creates snapshots of logical volumes, even though the data of each logical volume is typically distributed across multiple compute nodes.

In order to facilitate cluster-wide snapshots, each node assigns each logical volume a separate local FS. With this configuration, a snapshot of a logical volume is created by requesting the multiple compute nodes to create multiple respective FS-level snapshots of all the local FSs associated with that logical volume.

Typically, a snapshot is required to include all write commands that were acknowledged before the snapshot was created, but not necessarily "in-flight" write commands that were issued but not acknowledged before the snapshot was created. When the stored data is replicated, however, it is necessary that the different replicas of the data will comprise the exact same set of in-flight write requests. In other words, a given in-flight write request may be included in all replicas, or omitted from all replicas, but not included in one replica and omitted from another. If this consistency requirement is violated, a subsequent read command may return different values depending on which replica of the data is accessed.

The disclosed techniques enable the compute-node cluster to meet the above consistency requirement, i.e., ensure that all FS-level snapshots of replicated data hold exactly the same set of in-flight write requests: In some embodiments, a certain compute node (referred to as a source node) sends replicated data for storage in multiple compute nodes (referred to as destination nodes). The source node marks each outgoing write request in a manner that enables each destination node to determine whether the write request is pre-snapshot (i.e., issued before the snapshot request for the snapshot that the destination node is currently storing) or post-snapshot (i.e., issued after the snapshot request for the snapshot that the destination node is currently storing).

Each destination node receives the write requests, classifies them into pre-snapshot and post-snapshot write requests using the marks, and executes only the pre-snapshot write requests. Each post-snapshot request remains queued in the destination node until it becomes pre-snapshot, i.e., until the destination node receives the next snapshot request.

In an example embodiment, the source node assigns incrementing sequence numbers to successive snapshot requests. In addition, the source node marks each outgoing write request with the sequence number of the most recently issued snapshot request. Each destination node holds the sequence number of the snapshot it is currently storing. By comparing the sequence number held in the destination node with the sequence number of a received write request, the destination node is able to decide whether the write request is pre-snapshot or post-snapshot.

The above mechanism mitigates possible differences in the order-of-arrival of snapshot requests and write requests to the different nodes, and thus ensures that the FS-level snapshots of the different data replicas comprise exactly the same set of in-flight write requests. The disclosed techniques therefore maintain synchronization between snapshots stored on different compute nodes. Consistency among snapshots is retained regardless of possible differences in packet latency and order-of-arrival in different nodes, and without having to add dedicated buffering resources in the data path other than the existing buffers in the storage nodes. Unlike other possible solutions, the disclosed technique does not halt or suspend the system I/O in order to achieve synchronization.

System Description

FIG. 1 is a block diagram that schematically illustrates a computing system 20, which comprises a cluster of multiple compute nodes 24, in accordance with an embodiment of the present invention. System 20 may comprise, for example, a data center, a cloud computing system, a High-Performance Computing (HPC) system or any other suitable system.

Compute nodes 24 (referred to simply as "nodes" for brevity) typically comprise servers, but may alternatively comprise any other suitable type of compute nodes. System 20 may comprise any suitable number of nodes, either of the same type or of different types. Nodes 24 are connected by a communication network 28, typically a Local Area Network (LAN). Network 28 may operate in accordance with any suitable network protocol, such as Ethernet or Infiniband.

Each node 24 comprises a Central Processing Unit (CPU) 32. Depending on the type of compute node, CPU 32 may comprise multiple processing cores and/or multiple Integrated Circuits (ICs). Regardless of the specific node configuration, the processing circuitry of the node as a whole is regarded herein as the node CPU. Each node further comprises a memory 36 (typically a volatile memory such as Dynamic Random Access Memory—DRAM) and a Network Interface Card (NIC) 44 for communicating with network 28. Some of nodes 24 (but not necessarily all nodes) comprise one or more non-volatile storage devices (e.g., magnetic Hard Disk Drives—HDDs—or Solid State Drives—SSDs). Storage devices 40 are also referred to herein as physical disks or simply disks for brevity.

Nodes 24 may run various types of clients. Among other functions, the clients access non-volatile storage devices 40, e.g., issue write and read commands for storing and retrieving data. The disclosed techniques share the non-volatile storage resources of storage devices 40 across the entire compute-node cluster, and makes them available to the various clients. These techniques are described in detail below.

The description that follows refers mainly to Virtual Machines (VMs) that in turn run customer applications, for the sake of clarity. The disclosed techniques, however, are not limited to VMs and can be used with any other suitable types of clients, in both virtualized and non-virtualized environments.

Further aspects of running VMs over a compute-node cluster are addressed in U.S. patent application Ser. Nos. 14/181,791 and 14/260,304, which are assigned to the assignee of the present patent application and whose disclosures are incorporated herein by reference.

The system and compute-node configurations shown in FIG. 1 are example configurations that are chosen purely for the sake of conceptual clarity. In alternative embodiments, any other suitable system and/or node configuration can be used. The various elements of system 20, and in particular the elements of nodes 24, may be implemented using hardware/firmware, such as in one or more Application-Specific Integrated Circuit (ASICs) or Field-Programmable Gate Array (FPGAs). Alternatively, some system or node elements, e.g., CPUs 32, may be implemented in software or using a combination of hardware/firmware and software elements. In some embodiments, CPUs 32 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Distributed Data Storage Scheme

The VMs (or other clients) running on compute nodes 24 typically store and retrieve data by accessing virtual disks, also referred to as Logical Volumes (LVs). Each virtual disk in system 20 is typically assigned a logical Logical Unit Number (logical LUN, or simply LUN for brevity), and the address space within each virtual disk is defined by a range of Logical Block Addresses (LBAs). Nodes 24 store the data of the various logical disks in a distributed manner over the physical disks (storage devices 40). Typically, the data associated with a given virtual disk is distributed over multiple physical disks 40 on multiple nodes 24.

One of the fundamental requirements from a storage system is to create and manage snapshots of virtual disks. In the context of the present patent application and in the claims, the term "snapshot" refers to a freeze of a logical disk that is created at a specified point in time and retains the content of the logical disk at that time. The freeze is created without copying the data of the logical disk. A snapshot enables the system to revert back to the content of the virtual disk for a specific point in time, for example in case of failure.

In some embodiments, nodes 24 carry out a distributed yet synchronized snapshot creation and management scheme that is described in detail below. The description that follows begins with an overview of the storage scheme used in system 20, followed by an explanation of the snapshot management scheme. Further aspects of distributed snapshot management are addressed in U.S. patent application Ser. No. 14/333,521, which is assigned to the assignee of the present patent application and whose disclosure is incorporated herein by reference.

In some embodiments, the basic logical data storage unit in system 20 is referred to as a Distribution Unit (DU). In the present example, each DU comprises 1 GB of data. Alternatively, however, any other suitable DU size can be used, e.g., (although not necessarily) between 1 GB and 10 GB. Each DU is typically stored en-bloc on a given physical disk 40, and is typically defined as the minimal chunk of data that can be moved from one physical disk to another (e.g., upon addition or removal of a physical disk). DUs are typically replicated for redundancy, i.e., multiple replicas of a DU may be stored on different physical disks and nodes to protect against data loss in case of failure.

Figure 2:
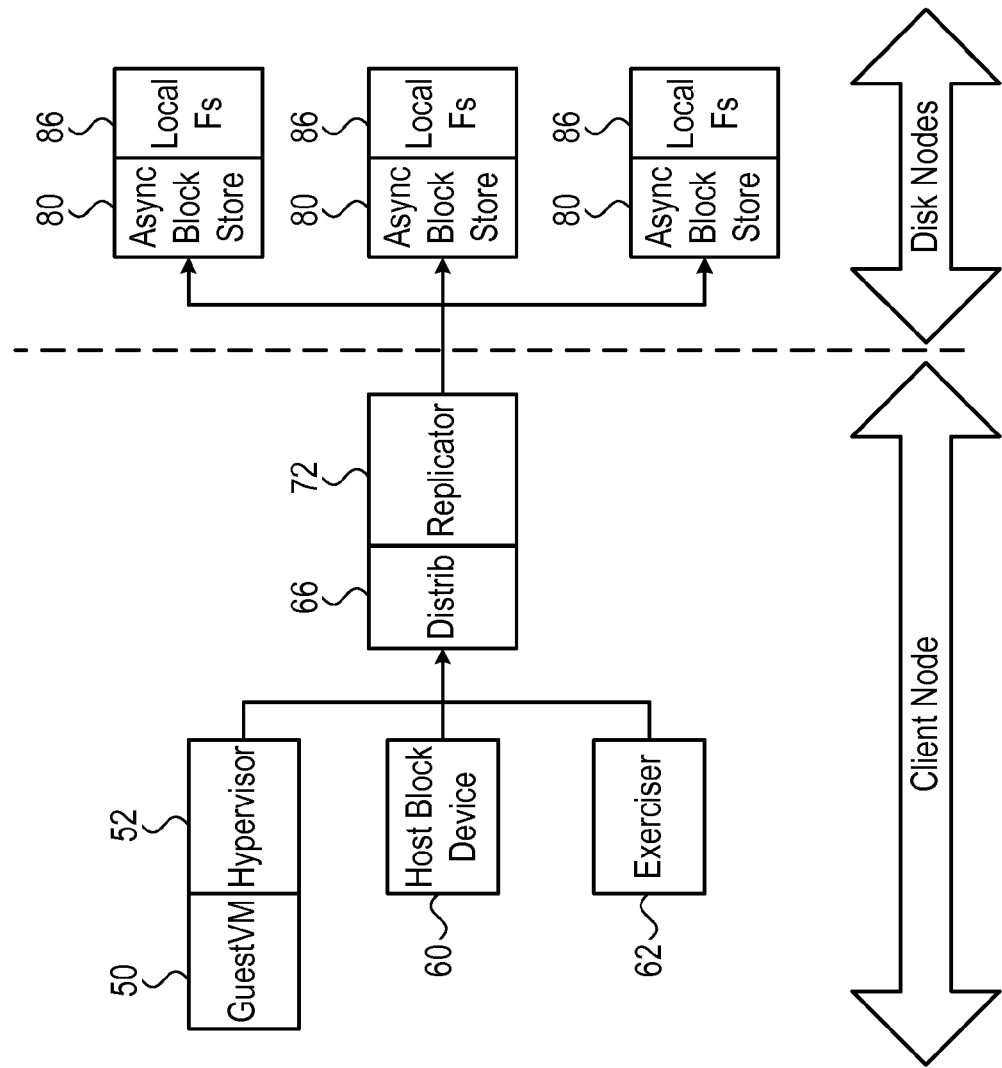
FIG. 2 is a diagram that schematically illustrates a distributed storage process in a compute-node cluster, in accordance with an embodiment of the present invention.

FIG. 2 is a diagram that schematically illustrates a distributed storage process in system 20, in accordance with an embodiment of the present invention. Generally, the data stored by a VM (or other client) running on a given node 24 may be stored physically on one or more disks 40 of one or more nodes 24 across system 20. For a particular storage operation by a VM, the node hosting the VM is referred to as a client node, and the nodes that physically store the data on their disks 40 are referred to as disk nodes. In some cases, some data of a VM may be stored on the same node that runs the VM. The logical separation between client node and disk nodes still holds in this scenario, as well. As noted above, the VM-related example is depicted purely by way of example, and the disclosed techniques can also be used with various other types of clients.

In FIG. 2, the left-hand-side of the figure shows the client-node part of the process, and the right-hand-side of the figure shows the disk-node part of the process. The process is a client-server process in which the client side runs on the client node and the server side runs on the disk node. In alternative embodiments, the various elements of FIG. 2 can be distributed over the nodes of the cluster in any other suitable way.

The client node runs one or more VMs 50, also referred to as guest VMs. A hypervisor 52 assigns system resources (e.g., memory, storage, network and computational resources) to VMs 50. Among other tasks, the hypervisor serves storage commands (also referred to as I/O requests) issued by the guest VMs. Hypervisor 52 may comprise, or may be based on, QEMU, or any other suitable hypervisor type.

Additionally or alternatively to VMs 50, other possible clients that generate write requests may comprise a host block device 60 and/or an exerciser 62. The storage commands issued by these modules are queued in memory, e.g., for example in operating system (e.g., UNIX) queues.

A distributor 66 identifies the physical disks 40 that correspond to the logical LUNs and LBAs specified in the storage commands, and distributes the storage commands to the appropriate disk nodes. Typically, distributor 66 first evaluates a distribution function, which translates each {logical LUN, LBA} pair into a respective DU. Having determined the desired DU to be accessed, distributor 66 looks up a distribution table, which maps each DU to a physical disk 40 on one of nodes 24. At this stage, distributor 66 has identified the disk node to which each storage command is to be forwarded.

Distributor 66 forwards the storage commands to a replicator 72, which replicates each DU so as to store each DU on two or more physical storage devices 40, usually on different nodes 24. The storage commands are then forwarded to the appropriate disk nodes.

In each disk node, one or more asynchronous block stores 80 manage the storage of data in one or more respective local File Systems (FS) 86 running on the disk node. Typically, a given disk node runs a separate local FS per LUN per DU. Local FS 86 manage storage of files in local disks 40 of the disk node in question. Typically, the local FS carries out tasks such as logical-to-physical address translation, disk free-space management, snapshot management, thin provisioning and FS-level replication.

Local FS 86 may be implemented using any suitable local file system. One possible example is the ZFS file system. In particular, the local FS supports a built-in snapshot management mechanism, which is used by the disclosed techniques.

The storage command received by the disk node typically specifies a certain logical LUN and LBA. The client node translates the {logical LUN, LBA} pair into a name of a local file in which the corresponding data is stored, and an offset within the file. Block store 80 then issues to local FS 86 a file read or write command with the appropriate file name. The local FS reads or writes the data by accessing the specified file.

The description above refers mainly to data flow from the client node to the disk node. Data flow in the opposite direction (e.g., retrieved data and acknowledgements of write commands) typically follows the opposite path from the disk node back to the client node. The various elements shown in FIG. 2 (e.g., hypervisor 52, distributor 66, replicator 72 and block store 80) typically comprise software modules running on CPUs 32 of nodes 24.

Figure 3:
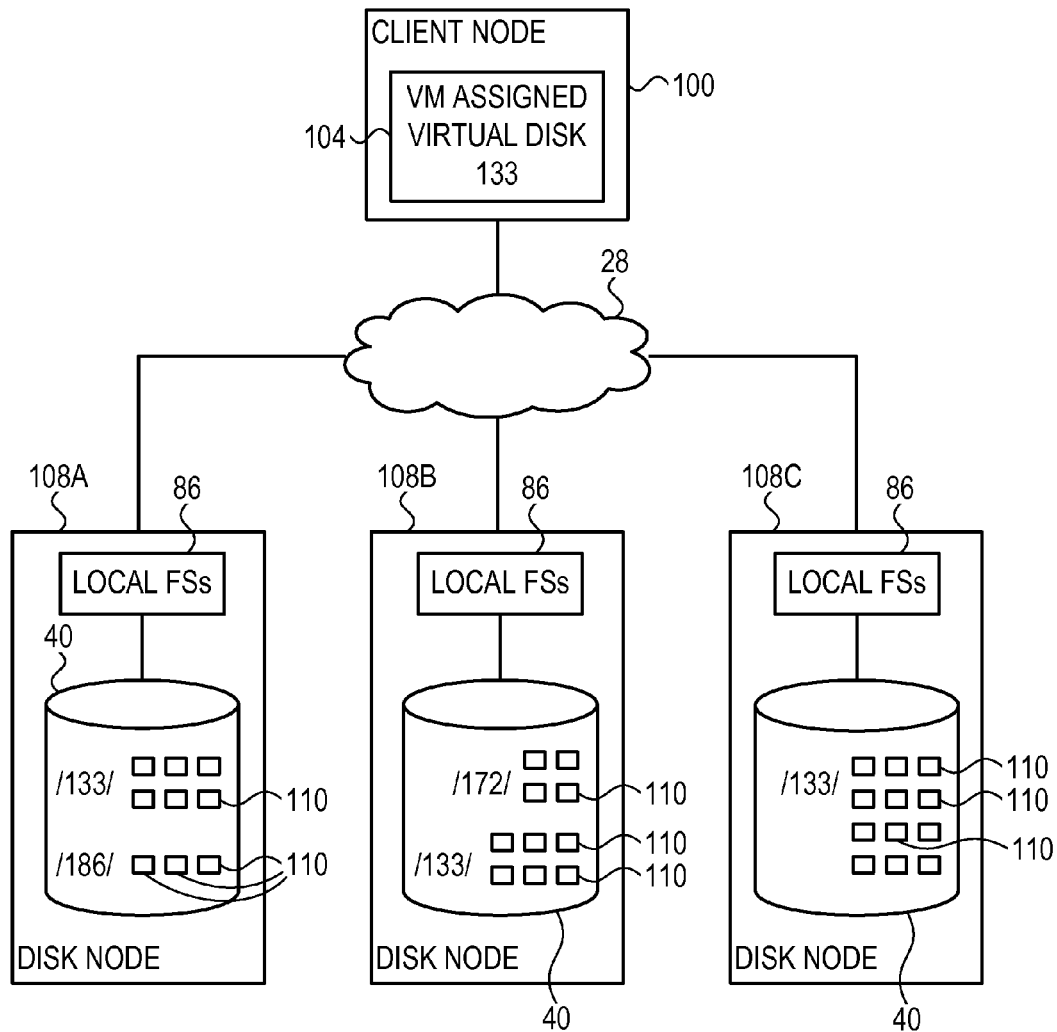
FIG. 3 is a block diagram that schematically illustrates a distributed storage scheme in a compute-node cluster, in accordance with an embodiment of the present invention.

FIG. 3 is a block diagram that schematically illustrates the distributed storage scheme in system 20, in accordance with an embodiment of the present invention. The figure shows a client node 100 that runs a guest VM 104, and three disk nodes 108A . . . 108C. In the present example, VM 104 accesses a virtual disk that is assigned the logical LUN #133. The data corresponding to logical LUN #133 is distributed among the three disk nodes.

Each disk node runs multiple local FSs 86, each local FS associated with a portion of a respective LUN belonging to a respective DU. In the present example, node 108A maintains local FSs for logical LUNs #133 and #186, node 108B maintains local FSs for logical LUNs #177 and #133, and node 108C maintains a single local FS for logical LUN #133. As can be seen in the figure, the data of logical LUN #133 (accessed by VM 104) is distributed over all three disk nodes.

Each local FS (also referred to as Data Set—DS) comprises one or more files 110, possibly in a hierarchy of one or more sub-directories. Each file 110 comprises a certain amount of data, e.g., 4 MB. In this manner, storage blocks are translated into files and managed by the local FS.

Each local FS, including its files and sub-directories, stores data that is all associated with a respective logical LUN and a respective DU (e.g., #133, #186 and #172 in the present example). This association is managed by block store 80 in each disk node: The block store translates each write command to a logical LUN/DU into a write command to a file that is stored in the local FS associated with that LUN/DU.

In some scenarios, a requirement may arise to create a snapshot of a certain logical LUN. A snapshot is typically requested by an administrator or other user. In some embodiments, system 20 creates and manages snapshots of logical LUNs (logical volumes or virtual disks), even though the data of each logical LUN is distributed over multiple different physical disks in multiple different compute nodes. This feature is implemented using the built-in snapshot mechanism of local file systems 86.

As explained above, block stores 80 in compute nodes 24 ensure that each local FS on disks 40 comprises files 110 of data that belongs exclusively to a respective logical LUN and a respective DU. Moreover, each local file system 86 supports a FS-level snapshot operation, which creates a local snapshot of the local FS with all its underlying sub-directories and files. Thus, creating time-synchronized FS-level snapshots of the various local FSs associated with a given logical LUN is equivalent to creating a snapshot of the entire logical LUN.

Efficient Synchronization of Snapshots Across Compute-Node Cluster

As explained above, a snapshot of a LUN is made-up of multiple FS-level snapshots created on multiple nodes by the respective local FSs. A snapshot is typically required to comprise all write commands that were acknowledged before the snapshot was created. For write commands that were issued but not acknowledged before the snapshot was created (referred to as "in-flight write commands") there is usually no firm requirement.

When the stored data is replicated, however, it is necessary that the different replicas of the data will comprise the same set of in-flight write requests. In other words, a given in-flight write request may be included in all replicas, or omitted from all replicas, but not included in one replica and omitted from another. This type of consistency is referred to as "crash consistency."

Figure 4:
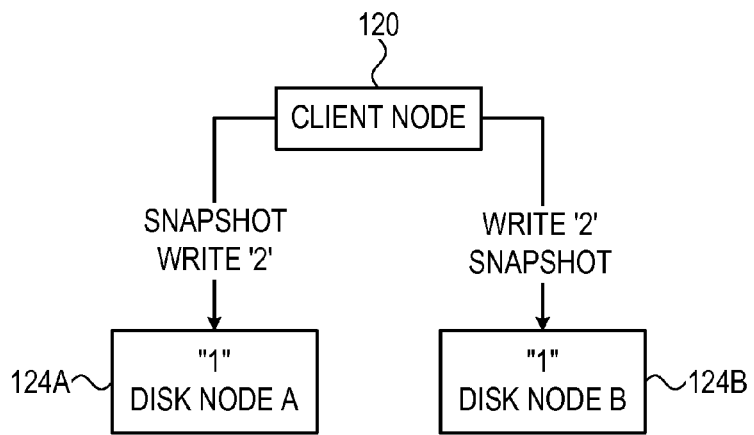
FIG. 4 is a diagram that schematically illustrates the effect of lack of synchronization between snapshots.

FIG. 4 is a diagram that schematically illustrates the effect of lack of crash-consistency between snapshots of replicated data. The figure shows a scenario in which a client node 120 stores two replicas of certain data on two respective disk nodes 124A and 124B.

Initially, a given data item has the value "1" on both nodes. At a certain point in time, client node 120 issues a snapshot request to nodes 124A and 124B, and then issues a write request that writes a value of "2" to the given data item. In the present example, node 124A receives the snapshot request and then the write request. Node 124B, on the other hand, receives the requests in the opposite order, i.e., the write request and then the snapshot request.

As a result, the given data item will have the value "1" in the snapshot on node 124A, and the value "2" in the snapshot on node 124B. When reading data from the snapshot, the user application will read a different data value depending on which replica is accessed. This sort of inconsistency is usually unacceptable. Defining one of the replicas as primary and the other as secondary does not solve the problem, since the secondary replica can still be used in the event of failure of the primary replica.

In some embodiments of system 20, each DU is replicated, and the multiple replicas of a given DU are sent for storage on storage devices 40 of different nodes 24. Consider a snapshot of a LUN to which the given DU belongs. In order for this snapshot to be consistent, the FS-level snapshots comprising the replicas of this DU must all comprise the exact same set of in-flight write requests. In the description that follows, this requirement is referred to as "synchronization" or "consistency," and a snapshot whose FS-level snapshots meet this condition is referred to as a synchronized or consistent snapshot.

In some embodiments, the nodes of system 20 synchronize the different replicas of a given DU, such that all FS-level snapshots of the DU hold exactly the same set of in-flight write requests. Consider a given DU that is replicated and sent from a client node (also referred to as source node) to two or more disk nodes (also referred to as destination nodes). In some embodiments, the client node marks each outgoing write request in a manner that enables each disk node to determine whether the write request is pre-snapshot (i.e., issued before the snapshot request for the snapshot that the disk node is currently storing) or post-snapshot (i.e., issued after the snapshot request for the snapshot that the disk node is currently storing).

Each disk node receives the write requests, classifies them into pre-snapshot and post-snapshot write requests using the marks, and executes only the pre-snapshot write requests. Each post-snapshot request remains queued in the disk node until it becomes pre-snapshot, i.e., until the disk node starts storing a later snapshot whose request was issued after the write request. The above mechanism ensures that the FS-level snapshots of the different replicas of a given DU comprise exactly the same set of write requests.

The client node may mark the outgoing write requests in various ways, and the disk nodes may use the marks in different ways to classify write requests as pre- or post-snapshot. In some embodiments, the client node numbers successive snapshot requests (per DU) with incrementing sequence numbers. In addition, the client node marks each outgoing write request with the sequence number of the most recently issued snapshot request.

Each disk node holds the sequence number of the snapshot it is currently storing. By comparing the sequence number held in the disk node with the sequence number of a write request, the disk node can decide whether the write request is pre-snapshot (issued before the snapshot request for the snapshot it is currently storing) or post-snapshot (issued after the snapshot request for the snapshot it is currently storing).

In alternative embodiments, however, the client node and disk nodes may use any other suitable marking and classification scheme.

Figure 5:
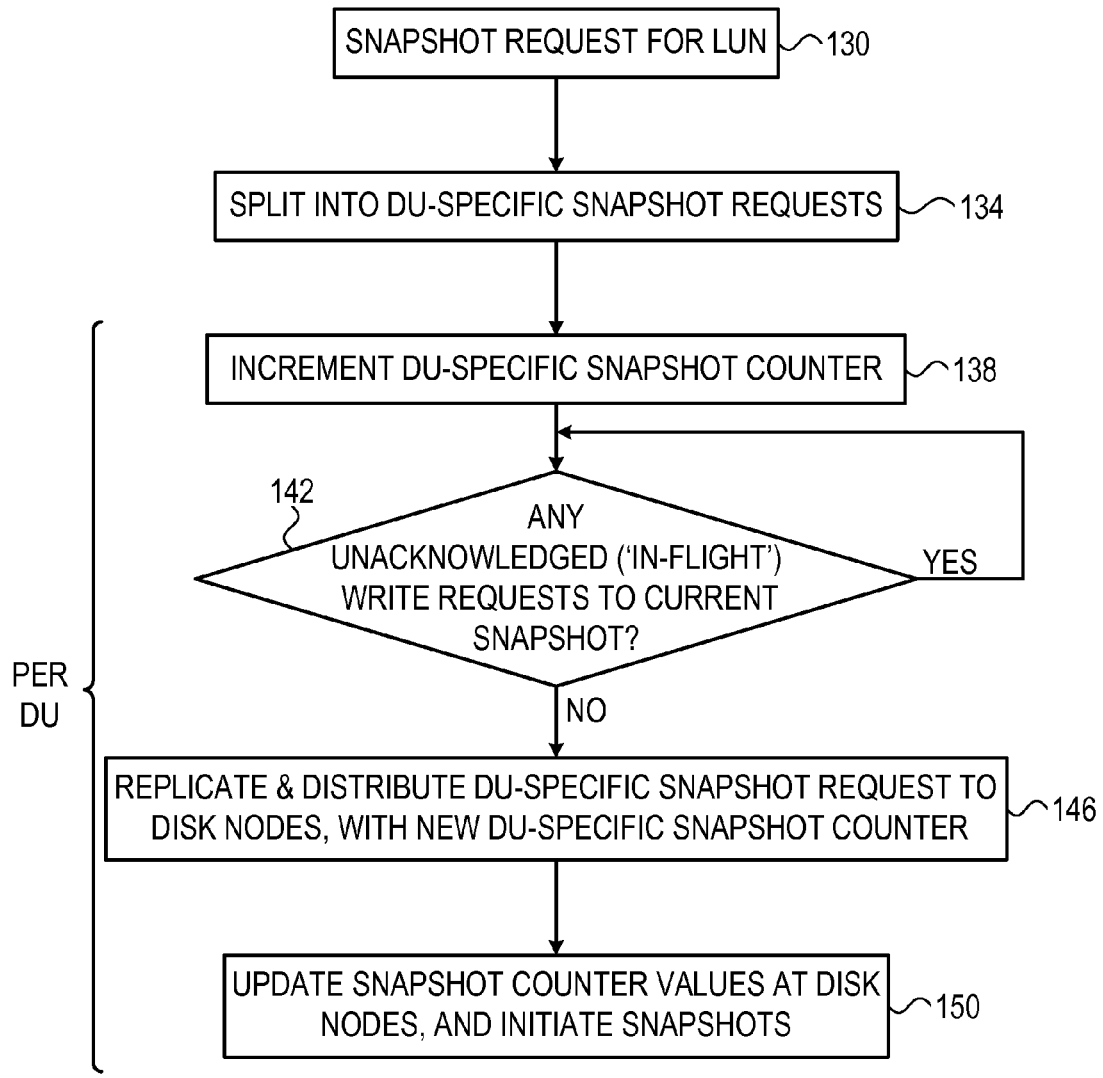
FIG. 5 is a flow chart that schematically illustrates a method for requesting a snapshot of a virtual disk synchronously across a compute-node cluster, in accordance with an embodiment of the present invention.

FIG. 5 is a flow chart that schematically illustrates a method for requesting a snapshot of a virtual disk synchronously across a compute-node cluster, in accordance with an embodiment of the present invention. The method begins with a snapshot request being issued for a certain LUN, at a LUN snapshot requesting step 130.

The LUN in question has been assigned to a certain VM running on a certain client node. At this client node, distributor 66 translates the LUN snapshot request into multiple DU-specific snapshot requests, for the various DUs that make up the LUN, at a splitting step 134.

At a counter incrementing step 138, replicator 72 in the client node increments the DU-specific counter, which holds the sequence number of the current snapshot. At a checking step 142, replicator 72 checks whether the DU still has any unacknowledged write requests.

After all write requests for the DU relating to the current snapshot have been acknowledged, replicator 72 replicates and distributes DU-specific snapshot requests to all the disk nodes that store replicas of the DU, at a snapshot request distribution step 146. The snapshot request is marked with the new counter value set at step 138, i.e., with the sequence number of the requested snapshot.

At a snapshot initiation step 150, each disk node receives the snapshot request, updates its local value of the snapshot counter, and initiates the new snapshot. The process of steps 138-150 is repeated per DU, for all DUs making up the LUN.

Figure 6:
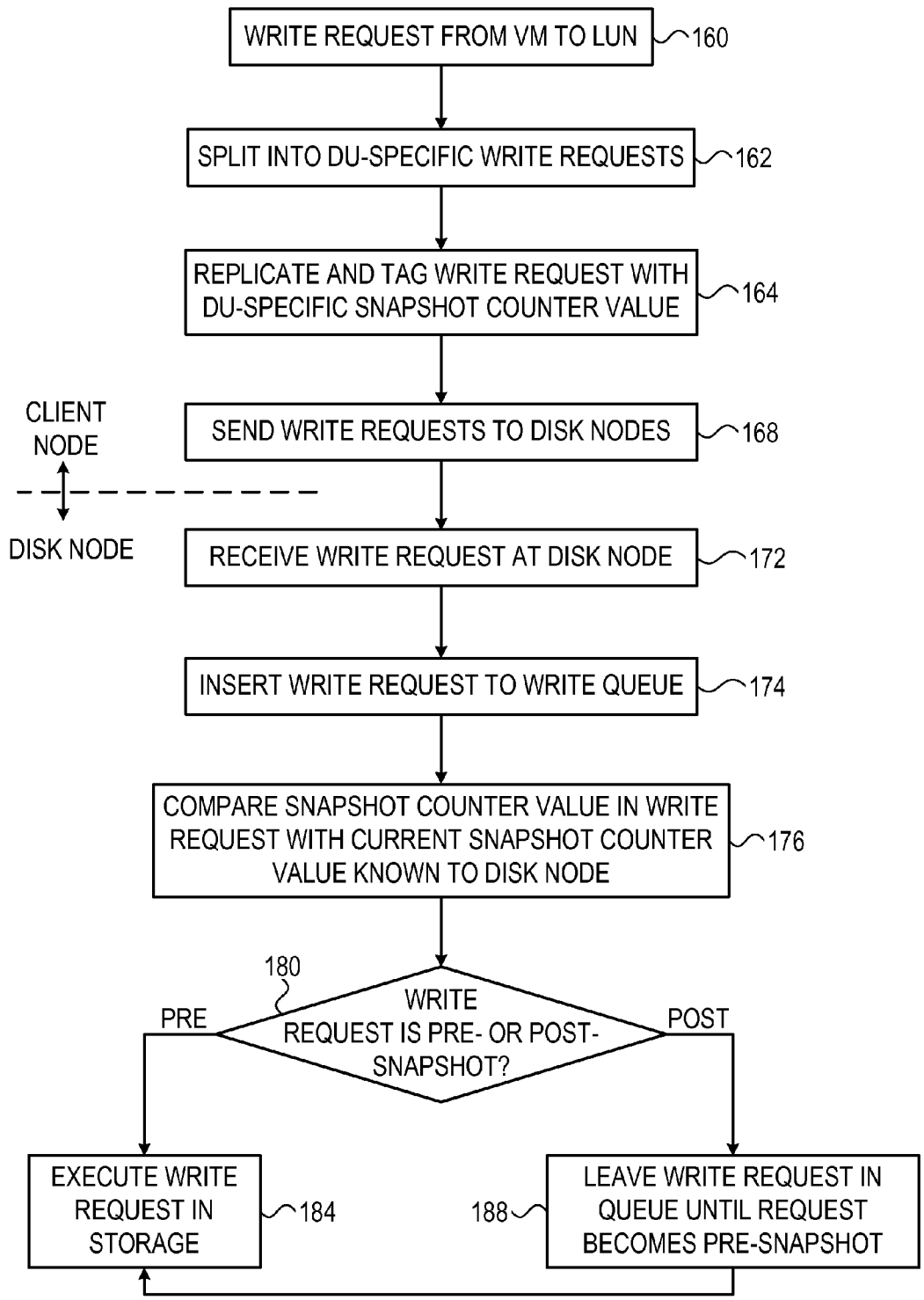
FIG. 6 is a flow chart that schematically illustrates a method for processing a write request in a compute-node cluster that uses snapshot synchronization, in accordance with an embodiment of the present invention.

FIG. 6 is a flow chart that schematically illustrates a method for processing a write request in a compute-node cluster that uses snapshot synchronization, in accordance with an embodiment of the present invention. The method begins with a certain VM (or other client) issuing a write request to a certain LUN, at a write initiation step 160.

At a splitting step 162, distributor 66 in the client node splits the write request into DU-specific write requests. At a tagging and replication step 164, distributor 66 identifies the DU to which each DU-specific write request belongs, and marks each write request with the snapshot counter value of that DU. Replicator 72 in the client node then replicates the tagged write requests. The client node then sends the replicated write requests to the multiple disk nodes serving the DUs in question, at a sending step 168.

Each of the disk nodes receives the DU-specific write requests, at a reception step 172. The description below refers to a given DU-specific write request received by a given disk node. At an insertion step 174, the write request is inserted into the appropriate write queue. At a comparison step 176, block store 80 in the disk node compares the snapshot counter value in the received write request with the snapshot counter value held at the disk node (i.e., with the sequence number of the snapshot that the disk node is currently storing).

At a classification step 180, block store 80 decides, based on the comparison above, whether the received write request is pre-snapshot or post-snapshot. If the write request is a pre-snapshot request, block store 80 forwards the write request to the appropriate local FS 86 (the local FS associated with the LUN/DU of the request) for execution (i.e., for storage in storage device 40 as part of the current snapshot), at a pre-snapshot processing step 184. If the write request is a post-snapshot request, block store 80 retains the write request in the disk node queues, at a post-snapshot processing step 188.

The block store queues the write request until it becomes pre-snapshot (i.e., until the disk node receives a later snapshot request whose sequence number indicates it was issued after the write request). At this stage the block store forwards the write request to FS 86 for execution at step 184.

In an example implementation, block store 80 in the disk node may carry out steps 176-188 by queuing all arriving write requests, and selectively serving only write requests that belong to the currently-processed snapshot (according to the snapshot counter values they carry). Write requests belonging to the next snapshot (according to their snapshot counter values) remain queued until the next snapshot request arrives.

The method descriptions of FIGS. 5 and 6 above are example methods that were chosen for the sake of conceptual clarity. In alternative embodiments, any other suitable processes can be used for requesting snapshots and for processing write requests. Moreover, the method description above refer to specific modules in the client node and disk nodes (e.g., distributor, replicator and block store) that perform the different method steps. In alternative embodiments, the various method steps can be performed by any other suitable module in the client node and disk nodes.

Although the embodiments described herein mainly address creation of LUN snapshots using multiple FS-level snapshots, the disclosed techniques can be carried out using any other suitable sub-tree structure, and nodes that are capable of creating snapshots of such sub-trees.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   generating data, which belongs to a logical volume, in a source node;
   preparing at the source node, write requests associated with the logical volume, for transmission from the source node to respective destination nodes, wherein the write requests include write requests for storing replicas of the same data directed to different destination nodes;
   at the source node, marking the write requests with marks that indicate to which snapshot the write request relates;
   sending the write requests with the markings to the respective destination nodes;
   sending from the source node to the destination nodes, a request to create a snapshot of the data; and
   at the destination nodes:
      receiving the write requests;
      distinguishing between pre-snapshot write requests and post-snapshot write requests based on the marks in the write requests, irrespective of an order-of-arrival of the write requests at the destination nodes;
      individually in each of the destination nodes, executing only the pre-snapshot write requests; and
      in each destination node, queuing post-snapshot write requests until arrival of a subsequent snapshot request.

2. The method according to claim 1, comprising in each destination node, queuing the received write requests and executing only the queued write requests that become pre-snapshot write requests.

3. The method according to claim 1, wherein marking the write requests comprises tagging each write request with a respective counter value indicating the snapshot that was most recently requested by the source node.

4. The method according to claim 3, wherein synchronizing the snapshots comprises, in each destination node, distinguishing between the pre-snapshot write requests and the post-snapshot write requests by comparing the respective counter value of each write request with a reference counter value of the snapshot that the destination node is currently storing.

5. The method according to claim 1, wherein sending the request to create a snapshot comprises receiving, by the source node, a request for generating a snapshot, determining write requests that were sent to destination nodes that should be included in the snapshot, and sending the request to create the snapshot only after receiving acknowledgements for the write requests determined to be included in the snapshot.

6. A system, comprising at least a source node and multiple destination nodes,
   wherein the source node is configured to generate data, which belongs to a logical volume, to prepare at the source node write requests associated with the logical volume, for transmission from the source node to respective destination nodes, wherein the write requests include write requests for storing replicas of the same data directed to different destination nodes, to mark the write requests with marks that indicate to which snapshot the write request relates, to send the write requests with the markings to the respective destination nodes, and to send from the source node to the destination nodes, a request to create a snapshot of the data; and
   wherein the destination nodes are configured to receive the write requests, to distinguish between the pre-snapshot write requests and the post-snapshot write requests based on the marks in the write requests, irrespective of an order-of-arrival of the write requests at the destination nodes, to execute only the pre-snapshot write requests, and to queue post-snapshot write requests until arrival of a subsequent snapshot request.

7. The system according to claim 6, wherein each destination node is configured to queue the received write requests and to execute only the queued write requests that become pre-snapshot write requests.

8. The system according to claim 6, wherein the source node is configured to mark each write request with a respective counter value indicating the snapshot that was most recently requested by the source node.

9. The system according to claim 8, wherein each destination node is configured to distinguish between the pre-snapshot write requests and the post-snapshot write requests by comparing the respective counter value of each write request with a reference counter value of the snapshot that the destination node is currently storing.

10. The system according to claim 6, wherein the source node is configured to receive a request for generating a snapshot, to determine write requests that were sent to destination nodes that should be included in the snapshot, and to send the request to create the snapshot only after receiving acknowledgements for the write requests determined to be included in the snapshot.

11. A computer software product, the product comprising a tangible non-transitory computer-readable medium in which program instructions are stored, including instructions, when read by processors of a source node and multiple destination nodes that are interconnected by a communication network, cause a processor of the source node to generate data, which belongs to a logical volume, to send write requests associated with the logical volume, for transmission from the source node to respective destination nodes, wherein the write requests include write requests for storing replicas of the same data directed to different destination nodes, to mark the write requests at the source node with marks that indicate to which snapshot the write request relates, to send the write requests with the markings to the respective destination nodes, and to send from the source node to the destination nodes, a request to create a snapshot of the data; and
   including instructions which when executed by processors of the destination nodes causes the destination nodes to
      receive the write requests, distinguish between pre-snapshot write requests and post-snapshot write requests based on the marks in the write requests, irrespective of an order-of-arrival of the write requests at the destination nodes,
to execute only the pre-snapshot write requests, and to queue post-snapshot write requests until arrival of a subsequent snapshot request.

12. The computer software product according to claim 11, wherein the instructions cause the processor of the source node to receive a request for generating a snapshot, to determine write requests that were sent to destination nodes that should be included in the snapshot, and to send the request to create the snapshot only after receiving acknowledgements for the write requests determined to be included in the snapshot.

* * * * *